Jan. 29, 1957 R. H. HARWOOD 2,779,091

ASSEMBLY JIG FOR PACKAGE UNIT PARTS BOARDS

Filed Dec. 15, 1953

INVENTOR.
ROBERT HAROLD HARWOOD

BY George Sipkin
George E. Pearson
ATTORNEYS

United States Patent Office 2,779,091
Patented Jan. 29, 1957

2,779,091

ASSEMBLY JIG FOR PACKAGE UNIT PARTS BOARDS

Robert H. Harwood, San Diego, Calif.

Application December 15, 1953, Serial No. 398,452
1 Claim. (Cl. 29—288)
(Granted under Title 35, U. S. Code (1952), sec. 266)

The invention described herein may be manufactured and used by or for the Government of the United States of America for governmental purposes without the payment of any royalties thereon or therefor.

This invention relates to an assembly jig for package unit parts boards and more particularly to an adjustable support for a parts board having pins projecting from the opposite sides thereof to facilitate the mounting and wiring of electronic components thereon.

In the past it has been necessary to lay the parts board on the bench or secure it in a vise while mounting and wiring electronic components thereon. When the parts board is laid on the bench, it is difficult to make the proper bends in the wires and do the soldering because the board slides and moves on the bench, and, if it is held in a vise, the operation is hindered by the vise and only one side can be worked on without removing and reclamping the parts board. A triangular jig has been utilized consisting of two triangular pieces with metal strips to mount the parts board, however, this jig will only permit working on one side of the parts board at a time and only one angle is available.

The jig of the present invention consists essentially of a heavy base member which will stay in position wherever desired on the work bench while mounting and soldering the components on the parts board which is slidably mounted in opposed longitudinal slots in the inner surfaces of two slender arms pivotally mounted on brackets. The brackets are slidably mounted in two parallel slots in the base member and may be clamped in position to provide the proper spacing between the supporting arms for parts boards of different widths. Clamping screws connected to the supporting arms and extending through arcuate slots in the brackets permit clamping the arms in any desired tilted position to facilitate the work.

One object of the present invention is to provide a jig to support a parts board and facilitate the assembly, mounting, and wiring of electronic components thereon.

Another object of the present invention is to provide an assembly jig for a parts board which may be adjusted to any desired angle to facilitate the work of mounting and wiring electronic components on the parts board.

Still another object of the present invention is to provide an adjustable angle jig which may be adjusted to accommodate parts boards of various widths and which permits the ready insertion and removal of the parts board therefrom.

Other objects and many of the attendant advantages of this invention will be readily appreciated as the same becomes better understood by reference to the following detailed description when considered in connection with the accompanying drawings wherein.

Figures 1, 2, 3:
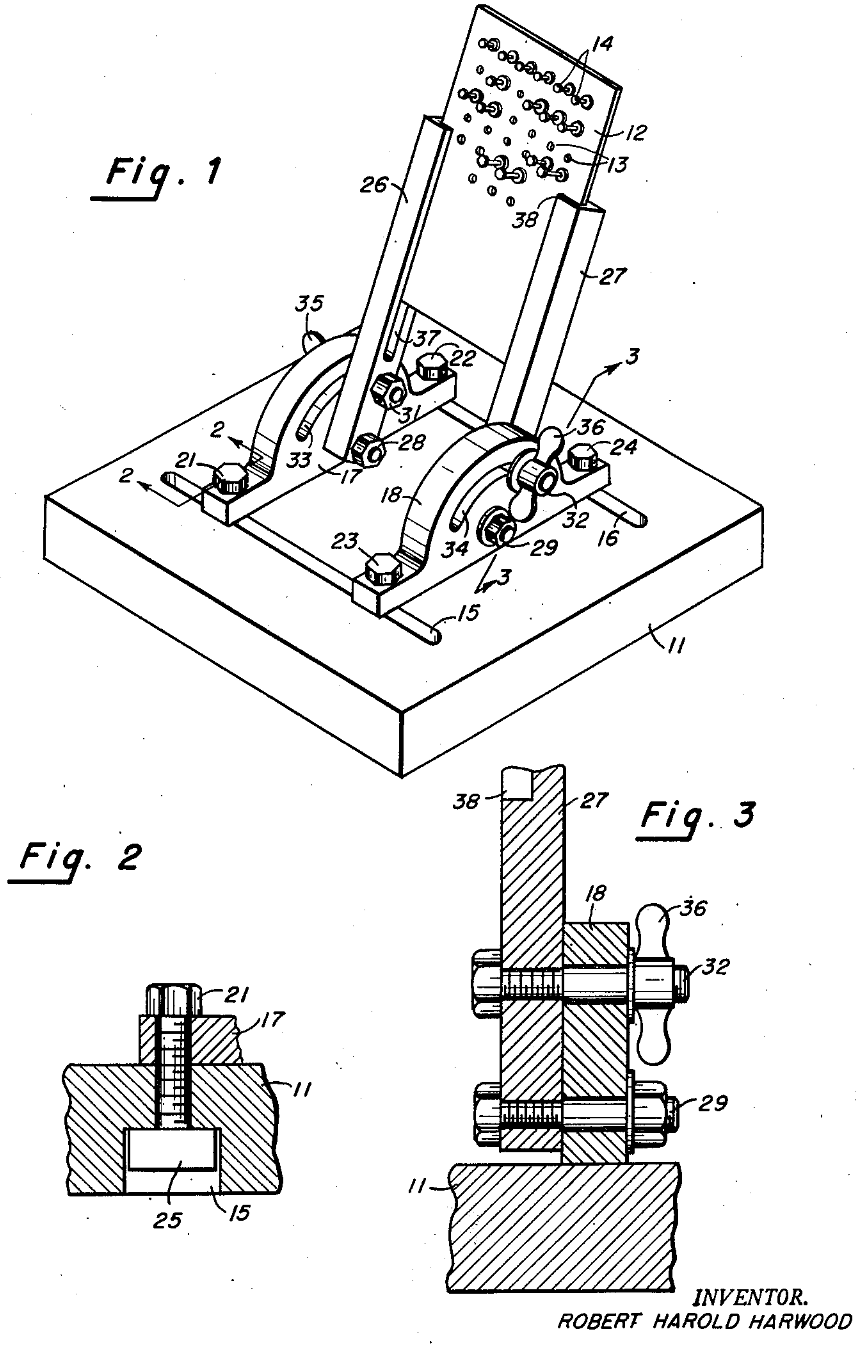
Fig. 1 is a pictorial view of one preferred embodiment of the present invention showing a parts board being inserted therein.
Fig. 2 is a partial section taken on the line 2—2 of Fig. 1.
Fig. 3 is a partial section taken on the line 3—3 of Fig. 1.

Referring now to the drawings in detail an assembly jig is shown in Fig. 1 illustrating one preferred embodiment of the present invention and comprises a base member 11 which is preferably rather large and formed of a heavy material such as cast iron or steel to firmly hold the device in position on a work bench while the technician is mounting and wiring electronic components on the parts board 12 which is preferably provided with a plurality of rows of openings such as those indicated at 13 in which the mounting pins, such as those indicated at 14, are inserted to facilitate the mounting and wiring of the components.

The base member 11 is provided with a pair of T-shaped slots 15 and 16, one of which is shown in detail in Fig. 2. The mounting brackets 17 and 18 are provided with a pair of bolts 21 and 22, and 23 and 24, respectively, which extend through the slots 15 and 16 and threadedly engaged square nuts such as the one shown at 25 in Fig. 2.

A pair of elongated arms 26 and 27 are pivotally mounted on bolts 28 and 29 extending through suitable bores in the brackets 17 and 18 as indicated in the detail section of Fig. 3 which illustrates one preferred construction for pivotally mounting and clamping the arms 26 and 27 in any desired tilted position.

Another pair of bolts 31 and 32 extend through the arms 26 and 27 and are slidably mounted in the arcuate slots 33 and 34, formed in the brackets 17 and 18 on a radius about the center of the pivot bolts 28 and 29. Wing nuts, such as those indicated at 35 and 36, are provided to facilitate clamping the arms 26 and 27 in parallel angular positions.

The arms 26 and 27 are provided with elongated grooves 37 and 38 formed in their inner opposed sides to slidably mount the parts board 12 as indicated in Fig. 1.

It will be apparent that by loosening the bolts 21 and 22, or bolts 23 and 24, or both pairs simultaneously, that the brackets 17 and 18 may be slid laterally to adjust the position of the arms 26 and 27 to provide a snug sliding fit for a parts board of any width.

The arms 26 and 27 may be adjusted to any angular position which facilitates the work of the individual technician or may be adjusted to permit working on both sides of the parts board simultaneously. In any case, the parts board may be readily slid out, turned over, or replaced by another parts board of the same size and shape and, if necessary, the jig may be readjusted to accommodate a different size parts board or to suit the convenience of the particular job or the particular technician doing the work.

While the construction of the present invention is particularly adapted for working on a parts board for electronic components, such as those utilized in the co-pending applications of Nye et al., Ser. No. 389,898, filed November 2, 1953, and Oleson, Ser. No. 392,065, filed November 13, 1953, it will be apparent that there are many analogous uses to which the structure of the present invention may be put.

Where the jig is to be utilized with only one size parts board, the brackets may be mounted in a fixed position on the base member or integrally formed thereon and the bottom of the supporting arms could be joined necessitating only one adjusting screw and wing nut with an arcuate slot formed in only one of the brackets. However, even in large scale production work, it would be probably advantageous to have a completely adjustable jig so that the same equipment can be utilized for production of units utilizing various sizes of parts boards at different times.

Obviously many modifications and variations of the present invention are possible in the light of the above teachings. It is therefore to be understood that within the scope of the appended claim the invention may be practiced otherwise than as specifically described.

What is claimed is:

An assembly jig for a parts board comprising a heavy base member having a pair of spaced, parallel, longitudinal T-slots therein, a pair of elongated, spaced, parallel, transverse brackets bearing on said base member and spanning said slots with the end portions of the brackets located over the respective slots, guiding and fastening elements extending through each said end portion and slidably received in said slots for adjustably securing said end portions to said base, each of said brackets having an elongated supporting arm pivoted thereto intermediate said end portions and an arcuate slot extending therethrough, said arcuate slot being located intermediate said secured end portions and formed on a radius about said pivot, and fastening elements extending through each arm and its corresponding slot for clamping the arms in adjusted position, each of said arms being provided with opposed longitudinal grooves formed in the inner sides thereof for slidably receiving a parts board upon which work is to be performed, said grooves each having sides of equal depths whereby access to both sides of the parts board is equally facilitated.

References Cited in the file of this patent

UNITED STATES PATENTS

| | | |
|---|---|---|
| 1,414,351 | Fritz | May 2, 1922 |
| 1,466,746 | Ohlen | Sept. 4, 1923 |
| 2,293,059 | Hirvonen | Aug. 18, 1942 |
| 2,679,370 | Bolser | May 25, 1954 |